(12) United States Patent
Balk et al.

(10) Patent No.: US 9,315,660 B2
(45) Date of Patent: Apr. 19, 2016

(54) LOW-VOC AQUEOUS HYBRID BINDERS

(75) Inventors: Roelof Balk, Boehl-Iggelheim (DE); Sebastian Roller, Mannheim (DE); Rolf Dersch, Neustadt (DE); Uwe Dittrich, Dannstadt-Schauernheim (DE)

(73) Assignee: BASF SE, Ludwigshafen (DE)

( * ) Notice: Subject to any disclaimer, the term of this patent is extended or adjusted under 35 U.S.C. 154(b) by 503 days.

(21) Appl. No.: 12/601,293

(22) PCT Filed: Jun. 12, 2008

(86) PCT No.: PCT/EP2008/057340
§ 371 (c)(1),
(2), (4) Date: Nov. 23, 2009

(87) PCT Pub. No.: WO2008/152078
PCT Pub. Date: Dec. 18, 2008

(65) Prior Publication Data
US 2010/0286325 A1 Nov. 11, 2010

(30) Foreign Application Priority Data
Jun. 15, 2007 (EP) .................... 07110413

(51) Int. Cl.
| C08L 33/10 | (2006.01) |
| C08L 51/00 | (2006.01) |
| C08F 2/22 | (2006.01) |
| C08F 283/01 | (2006.01) |
| C08F 291/00 | (2006.01) |
| C09D 5/02 | (2006.01) |
| C09D 133/06 | (2006.01) |
| C09D 135/06 | (2006.01) |
| C09D 167/08 | (2006.01) |
| C08L 25/02 | (2006.01) |
| C08L 33/06 | (2006.01) |

(52) U.S. Cl.
CPC ............... C08L 51/003 (2013.01); C08F 2/22 (2013.01); C08F 283/01 (2013.01); C08F 291/00 (2013.01); C09D 5/02 (2013.01); C09D 133/06 (2013.01); C09D 135/06 (2013.01); C09D 167/08 (2013.01); C08L 25/02 (2013.01); C08L 33/06 (2013.01)

(58) Field of Classification Search
CPC ..... C08F 283/01; C08F 291/06; C08L 51/003
USPC .......................................................... 526/87
See application file for complete search history.

(56) References Cited

U.S. PATENT DOCUMENTS

| 4,116,903 | A | * | 9/1978 | Lietz et al. ..................... 524/381 |
| 4,179,417 | A | * | 12/1979 | Sunada et al. ................ 525/444.5 |
| 4,267,091 | A | * | 5/1981 | Geelhaar et al. ............... 524/189 |
| 4,447,567 | A | * | 5/1984 | Geerdes et al. ................ 523/501 |
| 4,451,596 | A | | 5/1984 | Wilk et al. |
| 4,624,973 | A | * | 11/1986 | Kuwajima et al. ............. 523/221 |
| 5,753,740 | A | * | 5/1998 | Odawa et al. .................. 524/414 |
| 6,262,149 | B1 | * | 7/2001 | Clark et al. ..................... 523/501 |
| 6,277,910 | B1 | * | 8/2001 | Rassing et al. ................. 524/501 |
| 6,333,378 | B1 | | 12/2001 | Clark et al. |
| 6,369,135 | B1 | * | 4/2002 | Schork et al. .................. 523/500 |
| 6,627,700 | B1 | * | 9/2003 | Kadambande et al. ........ 525/7.3 |
| 2002/0151629 | A1 | * | 10/2002 | Buffkin et al. ................. 524/284 |
| 2003/0134970 | A1 | * | 7/2003 | Crumley et al. ............... 524/589 |
| 2008/0262145 | A1 | | 10/2008 | Roschmann et al. |
| 2008/0275165 | A1 | * | 11/2008 | Balk et al. ...................... 523/501 |
| 2009/0004394 | A1 | * | 1/2009 | Koller et al. ................ 427/385.5 |
| 2010/0160586 | A1 | * | 6/2010 | Koglin et al. .................. 526/273 |
| 2010/0286325 | A1 | * | 11/2010 | Balk et al. ...................... 524/457 |
| 2011/0144258 | A1 | * | 6/2011 | Roller et al. ................... 524/457 |

FOREIGN PATENT DOCUMENTS

| DE | 31 32 937 | | 3/1983 |
| EP | 0 072 979 | | 3/1983 |
| EP | 0 083 137 | | 7/1983 |
| EP | 0 267 562 | | 5/1988 |
| EP | A-0522419 | * | 7/1991 |
| EP | 0 874 875 | | 6/2001 |
| EP | 1 382 663 | | 1/2004 |

OTHER PUBLICATIONS

U.S. Appl. No. 12/741,244, filed May 4, 2010, Roller, et al.
U.S. Appl. No. 12/996,306, filed Dec. 3, 2010, Bette, et al.
Ullmann's Encyclopedia of Industrial Chemistry, VCH Weinheim, vol. A21, 5th edition, total pp. 3 and 169-171, (1992).
Zosel, von Dr. Albrecht "Methoden der Kunststoffphysik in der Lackpruefung", Farbe Und Lack, vol. 82, No. 2, pp. 125-134, (1976).
Ullmanns Encyklopaedie Der Technischen Chemie, "Polyacryl-Verbindungen bis Quecksilber", vol. 19, pp. 17-18, (1980).
"Makromolekulare stoffe", Georg Thieme Verlag, Stuttgart, vol. XIV/1, pp. 411-420, (1961).
"Makromolekulare stoffe", Georg Thieme Verlag, Stuttgart, vol. 14/1, pp. 192-208, (1961).

* cited by examiner

*Primary Examiner* — Michael A Salvitti
(74) *Attorney, Agent, or Firm* — Oblon, McClelland, Maier & Neustadt, L.L.P

(57) ABSTRACT

The present invention relates to aqueous binder compositions obtainable by emulsion polymerization of (A) at least one $C_1$-$C_{10}$ alkyl (meth)acrylate, and/or a vinylaromatic compound having up to 20 C atoms, or mixtures thereof (monomers A), (B) and also, if appropriate, further monomers B, and (C) at least one water-soluble alkyd resin having a weight-average molecular weight between 5000 and 40 000 Da, wherein the polymerization of the monomers A and also, if appropriate, B and the alkyds C is carried out in the form of a parallel feed process, and also to their preparation and use in coating materials.

16 Claims, No Drawings

LOW-VOC AQUEOUS HYBRID BINDERS

The present invention relates to low-VOC aqueous hybrid binders, to a process for preparing them, and to their use in coating materials, more particularly in high-gloss coating materials (high-gloss paints).

Binders for coating materials can conventionally be subdivided into two groups: solventborne systems, or systems with water as solvent or dispersion medium.

The first group includes, among others, the predominant part of the alkyd binders; the second group includes, among others, the acrylate dispersions.

The first group is at present under fire on environmental grounds, and a switch would therefore be desirable to waterborne systems with a low fraction of volatile organic compounds (VOC content).

EP 1 382 663 discloses water-emulsifiable or water-dilutable products. The water-dilutable oils or alkyd resins are reacted with cycloolefinically unsaturated anhydrides.

EP 874 875 discloses a water-based hybrid binder composition and its use as a component in a paint or varnish mixture, the hybrid binder composition possessing a dry matter fraction of 60% to 95% by weight.

DE 313 2937 discloses a process for preparing water-dilutable resin formulations based on alkyd resins and/or polyacrylates, where in a first stage the water-dilutable alkyd resin dispersion is prepared and subsequently the resulting alkyd resin dispersion, in a second process stage, is polymerized with acrylic and/or methacrylic acid derivatives.

U.S. Pat. No. 6,333,378 discloses waterborne alkyd-acrylate hybrid systems which are prepared by the polymerization of a miniemulsion sheared beforehand and comprising an alkyd and at least one acrylate monomer having a latently oxidative functionality.

These compositions of the prior art, however, have the disadvantage that they do not meet the desired requirements in terms of gloss and surface smoothness and contain a high proportion of alkyds.

It was an object of the invention, therefore, to develop waterborne alkyd-acrylate hybrid binders, their preparation, and their use for coating materials, more particularly for high-gloss paints and their formulation, these binders being distinguished by a very high gloss and low haze in conjunction with a high hiding power.

This object has been achieved in accordance with the invention by means of aqueous binder compositions obtainable by emulsion polymerization of
(A) at least one $C_1$-$C_{10}$ alkyl (meth)acrylate, and/or a vinylaromatic compound having up to 20 C atoms, or mixtures thereof (monomers A),
(B) and also, if appropriate, further monomers B, and
(C) at least one water-soluble alkyd resin having a weight-average molecular weight between 5000 and 40 000 Da, wherein the polymerization of the monomers A and also, if appropriate, B and the alkyds C is carried out in the form of a parallel feed process.

With the binder prepared in accordance with the invention a very high gloss and low haze is produced, and the VOC content is low.

The invention further provides a process for preparing aqueous binder compositions by emulsion polymerization of
(A) at least one $C_1$-$C_{10}$ alkyl (meth)acrylate, and/or a vinylaromatic compound having up to 20 C atoms, or mixtures thereof (monomers A),
(B) and also, if appropriate, further monomers B, and
(C) at least one water-soluble alkyd resin having a weight-average molecular weight between 5000 and 40 000 Da, wherein the polymerization of the monomers A and/or B and the alkyds C is carried out in the form of a parallel feed process.

The emulsion copolymer preferably comprises
(A) 20% to 90% by weight of monomers A,
(B) 0% to 20% by weight of further monomers B, and
(C) 10% to 60% by weight of alkyd C.

The emulsion copolymer more preferably comprises
(A) 30% to 79.5% by weight of monomers A,
(B) 0.5% to 20% by weight of further monomers B, and
(C) 20% to 50% by weight of alkyd C.

The emulsion copolymer very preferably comprises
(A) 50% to 70% by weight of monomers A,
(B) 2% to 10% by weight of further monomers B, and
(C) 20% to 50% by weight of alkyd C.

Examples of principal monomers A include $C_1$-$C_{10}$ alkyl (meth)acrylates, preferably methyl methacrylate, methyl acrylate, ethyl acrylate, n-, iso- or tert-butyl (meth)acrylate, 2-propylheptyl acrylate, and 2-ethylhexyl acrylate, or mixtures thereof.

Examples of suitable vinylaromatic compounds of the monomers A include styrene, vinyltoluene, α- and p-methylstyrene, α-butylstyrene, 4-n-butylstyrene, 4-n-decylstyrene or mixtures thereof, and preferably styrene.

Preferred combinations of the monomers A are n-butyl acrylate, styrene and butyl (meth)acrylate, the styrene fraction being less than or equal to 25% by weight.

By the further monomers B are meant, for example, monomers comprising hydroxyl groups, more particularly $C_1$-$C_{10}$ hydroxyalkyl (meth)acrylates, (meth)acrylamide, ethylenically unsaturated acids, more particularly carboxylic acids, such as (meth)acrylic acid, and their anhydrides, dicarboxylic acids and their anhydrides, or monoesters, e.g., itaconic acid, maleic acid, fumaric acid, and maleic anhydride, or mixtures thereof, ureido(meth)acrylates, acetoacetoxyalkyl (meth) acrylates or diacetoneacrylamide.

A preferred monomer B is acetoacetoxyethyl (meth)acrylate with a fraction <5% by weight.

The monomer mixture A or A and B has a composition such that, if polymerized separately, it would lead theoretically to a polymer having a glass transition temperature $T_g$ less than 50° C. but >20° C., preferably less than 40° C. and >20° C., more preferably less than 30° C. and >20° C.

By the glass transition temperature $T_g$ here is meant the midpoint temperature determined in accordance with ASTM D 3418-82 by differential thermal analysis (DSC) (vgl. Ullmann's Encyclopedia of Industrial Chemistry, 5th edition, volume A 21, VCH Weinheim 1992, p. 169, and also Zosel, Farbe und Lack 82 (1976), pp. 125-134; see also DIN 53765).

According to Fox (see Ullmanns Enzyklopädie der technischen Chemie, 4th edition, volume 19, Weinheim (1980), pp. 17, 18) the glass transition temperature $T_g$ can be estimated. The glass transition temperature of weakly crosslinked or uncrosslinked copolymers at high molar masses is given in good approximation by:

$$\frac{1}{T_g} = \frac{X^1}{T_g^1} + \frac{X^2}{T_g^2} + \dots \frac{X^n}{T_g^n}$$

where $X^1, X^2, \dots, X^n$ are the mass fractions 1, 2, ..., n and $T_g^1, T_g^2, \dots, T_g^n$ are the glass transition temperatures of the polymers constructed in each case only from one of the monomers 1, 2, ..., n, in degrees Kelvin. The latter are known, for example, from Ullmann's Encyclopedia of Industrial Chemistry, VCH, 5th ed., Weinheim, vol. A 21 (1992) p. 169 or from J. Brandrup, E. H. Immergut, Polymer Handbook 3rd ed., J. Wiley, New York 1989.

An alkyd resin (C) is a polyester which has been esterified with a drying oil, a fatty acid or the like (U. Poth, Polyester und Alkydharze, Vincentz Network 2005).

The alkyd resin (C) is more particularly an alkyd resin solution which is water-dilutable, after neutralization if appropriate, and is based on an alkyd resin, having a sufficiently high acid number of preferably 30-65 mg KOH/g alkyd resin solids, and having a weight-average molecular weight of >5000 and <40 000 Da, preferably >8000 and <35 000 Da, and more preferably >10 000 and <35 000 Da.

The molecular weights are determined by size exclusion chromatography (SEC).

The acid number is the amount of potassium hydroxide, expressed in mg, which is needed to neutralize 1 g of the sample.

Examples of preferred alkyd resins C are the products WorlëeSol® 61A, WorlëeSol® 61E, WorlëeSol® 65A from Worlée, and Synthalat® W46 or Synthalat® W48 from Synthopol.

The Process for the Preparation

For the emulsion polymerization it is common to use ionic and/or nonionic emulsifiers and/or protective colloids or stabilizers as surface-active compounds.

A detailed description of suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, in contradistinction to the protective colloids, are typically below 2000 g/mol. Where mixtures of surface-active substances are used, the individual components must of course be compatible with one another, something which in case of doubt can be checked by means of a few preliminary tests. It is preferred to use anionic and nonionic emulsifiers as surface-active substances. Customary accompanying emulsifiers are, for example, ethoxylated fatty alcohols (EO degree: 3 to 50, alkyl radical: $C_8$ to $C_{36}$), ethoxylated mono-, di- and tri-alkylphenols (EO degree: 3 to 50, alkyl radical: $C_4$ to $C_9$), alkali metal salts of dialkyl esters of sulfosuccinic acid and also alkali metal salts and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: $C_{12}$ to $C_{18}$), of alkylarylsulfonic acids (alkyl radical: $C_9$ to $C_{18}$), and of sulfates of ethoxylated fatty alcohols.

Suitable emulsifiers are also found in Houben-Weyl, Methoden der organischen Chemie, volume 14/1, Makromolekulare Stoffe [Macromolecular compounds], Georg Thieme Verlag, Stuttgart, 1961, pages 192 to 208.

The surface-active substance is typically used in amounts of 0.1% to 10% by weight, based on all the monomers to be polymerized.

Examples of water-soluble initiators for the emulsion polymerization are ammonium salts and alkali metal salts of peroxodisulfuric acid, e.g., sodium peroxodisulfate, hydrogen peroxide, or organic peroxides, e.g., tert-butyl hydroperoxide.

Also suitable are what are called reduction-oxidation (redox) initiator systems.

The redox initiator systems are composed of at least one, usually inorganic, reducing agent, and one organic or inorganic oxidizing agent.

The oxidizing component comprises, for example, the initiators already specified above for the emulsion polymerization.

The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used together with soluble metal compounds whose metallic component is able to exist in a plurality of valence states.

Typical redox initiator systems are, for example, ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component for example, may also be mixtures, an example being a mixture of the sodium salt of hydroxymethanesulfinic acid and sodium disulfite.

The amount of the initiators is generally 0.1% to 10% by weight, preferably 0.1% to 5% by weight, very preferably 0.4% to 1% by weight, based on all the monomers to be polymerized. It is also possible for two or more different initiators to be used in the emulsion polymerization.

The emulsion polymerization takes place in general at 30 to 150° C., preferably 50 to 95° C., very preferably between 80 and 95° C. The polymerization medium may be composed either of water alone or else of mixtures of water and water-miscible liquids such as methanol. Preference is given to using just water. The emulsion polymerization can be carried out either as a batch operation or in the form of a feed process, including staged or gradient procedures.

In a feed vessel, a preemulsion of the monomers A or A and B and emulsifiers is prepared, and in parallel with this, in a second feed vessel, an aqueous neutralized solution of at least one water-soluble alkyd C is made ready.

Subsequently these two feed streams are metered in parallel to a polymerization vessel, in which either a seed dispersion has been introduced as an initial charge, or else a seed has been formed in situ from a portion of the preemulsion of A or A and B and the initiator.

The polymerization typically takes place by way of two or more spatially separate feed streams, of which one or more comprise the monomers in pure form or in emulsified form, and are supplied continuously, in stages or under a concentration gradient to the polymerization zone, the polymerization being maintained.

In parallel with these two feed streams an initiator feed stream as well is commenced.

Following the polymerization, the batch is stirred and a chemical deodorization is carried out.

It is of course also possible to include part of the neutralized aqueous alkyd feed in the initial charge to the reactor vessel, or to end the alkyd feed earlier than the preemulsion feed, or not to commence the alkyd feed until later than the preemulsion feed.

Preferably, however, there is no initial charge, and the alkyd feed is metered in at the same time as the preemulsion feed. This produces very homogeneous distribution of the alkyd throughout the polymer. This is essential to the formation of very smooth surfaces and high gloss.

The manner in which the initiator is added to the polymerization vessel in the course of the free-radical aqueous emulsion polymerization is known to a person of ordinary skill in the art. It may either be included in its entirety in the initial charge to the polymerization vessel, or else employed continuously or in stages at the rate at which it is consumed in the course of the free-radical aqueous emulsion polymerization. In each case this will be dependent, in a manner known to a person of ordinary skill in the art, both on the chemical nature of the initiator system and on the polymerization temperature. Preferably a part is included in the initial charge, and the remainder is supplied to the polymerization zone at the rate at which it is consumed.

To remove residual monomers it is also possible to add initiator after the end of the emulsion polymerization proper, i.e., after a monomer conversion of at least 95%. Redox systems are typically employed. This may also be followed by physical deodorization.

The result is an aqueous polymer dispersion which typically has a polymer content (solids content) of 20% to 70% by weight, preferably 40% to 60% by weight, based on the polymer dispersion.

An advantage of the process of the invention is the relatively low viscosity of the preemulsion and of the alkyd feed. Both in the case of a preemulsion in which the water-soluble alkyd as well is being taken up, and in the case of a miniemulsion of monomers and alkyd (presheared preemulsion), the viscosities are very high and the alkyd fraction for use is limited.

The polymer is introduced as a binder composition into the paint or varnish mixture.

The coating material comprises further auxiliaries customary for coating materials, such as pigments, for example. The term "pigment" refers collectively to all pigments, extenders and fillers, examples being color pigments, white pigments, and inorganic fillers.

Mention may be made of inorganic white pigments such as titanium dioxide, preferably in the rutile form, barium sulfate, zinc oxide, zinc sulfide, basic lead carbonate, antimony trioxide, lithopones (zinc sulfide+barium sulfate) or colored pigments, examples being iron oxides, carbon black, graphite, zinc yellow, zinc green, ultramarine, manganese black, antimony black, manganese violet, Paris blue or Schweinfurt green. Besides the inorganic pigments, the emulsion paints of the invention may also comprise organic color pigments, examples being sepia, gamboge, Cassel brown, toluidine red, Para red, Hansa yellow, indigo, azo dyes, anthraquinonoid and indigoid dyes, and also dioxazine, quinacridone, phthalocyanine, isoindolinone and metal complex pigments.

Synthetic white pigments with air inclusions for increasing light scattering may also be employed. Examples are the Rhopaque™ dispersions.

Examples of suitable fillers/extenders include aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. In coating materials preference is of course given to finely divided fillers/extenders. The fillers/extenders can be used as individual components. In practice, however, mixtures of fillers/extenders have been found particularly appropriate, examples being calcium carbonate/kaolin and calcium carbonate/talc. For the glossy coating materials of the invention, small amounts, if any, of very finely divided fillers/extenders are acceptable. It is preferred not to use fillers/extenders.

The fraction of the pigments can be described by the pigment volume concentration (PVC), i.e., the ratio of the volume of the pigments to the total volume of the dried coating material. The high-gloss paints of the invention have a PVC in the range from 12% to 35%, preferably 15% to 30%.

Besides the polymer and pigment, the aqueous coating material of the invention may comprise further auxiliaries.

The customary auxiliaries, besides the emulsifiers used in the polymerization, include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and salts of naphthalenesulfonic acids, more particularly their sodium salts.

Mention may be made additionally of flow control agents, defoamers, biocides, and thickeners.

Examples of suitable thickeners include associative thickeners. Preferred associative thickeners are polyurethane thickeners. The amount of thickener is preferably less than 1% by weight, more preferably less than 0.6% by weight, of thickener solids, based on coating material.

The coating materials of the invention are prepared in a conventional manner by blending the components in mixing equipment customary for this purpose. It has been found appropriate to prepare an aqueous paste or dispersion from the pigments, water, and, if appropriate, the auxiliaries, and only then to mix the polymeric binder—i.e., generally speaking, the aqueous dispersion of the polymer—with the pigment paste or pigment dispersion.

The coating materials of the invention comprise in general 30% to 75% by weight and preferably 40% to 65% by weight of nonvolatiles. By these are meant all constituents of the formulation that are not water, but at least the total amount of binder solids, pigment, and auxiliaries solids. The volatile constituents are predominantly water.

The coating material is preferably a highly glossy coating material.

Through additization—addition of a photoinitiator, or of a siccative—it is possible to accelerate surface crosslinking.

Suitable photoinitiators are those which are excited by sunlight, examples being benzophenone or derivatives of benzophenone. Suitable siccatives are the metal compounds recommended for aqueous alkyd resins, examples being those based on Co or Mn (review in U. Poth, page 183 f).

The gloss of the coating material is determined in accordance with DIN EN ISO 2813: the coating material is applied with a 240 μm slot width to a glass plate and is dried at room temperature for 72 hours. The test specimen is inserted into a calibrated reflectometer of haze-gloss type (from Byk-Gardner, Geretsried), and the reflectometer value, at 20° and 60° incident angles, and also the haze are read off. The reflectometer value determined is a measure of the gloss (the higher the reflectometer value, the higher the gloss).

The gloss of the high-gloss paints is preferably greater than 60 at 20° and greater than 80 at 60°.

The reflectometer value is determined at 23° C. and is reported dimensionlessly as a function of the incident angle, e.g., 40 at 20°.

The coating material of the invention can be applied in customary fashion to substrates, by means of spreading, spraying, dipping, rolling, knife-coating, etc., for example.

The coating materials of the invention are employed in the segment of decorative coatings for glossy and highly glossy surfaces. Substrates may be wood, metal, plastics, paper or others.

The coating materials of the invention are notable for ease of handling, good processing properties, high hiding power, and, in particular, high gloss. The pollutant content of the coating materials is low. The equipment used can be easily cleaned with water.

EXAMPLES

Example 1

A polymerization vessel equipped with metering apparatus and temperature regulation was charged with the following:

| Initial charge: | 108.5 g | water |
|---|---|---|
| | 19.1 g | a polystyrene seed dispersion having a solids content of 33% and an average particle size of 30 nm |
| | 1.5 g | a 15% strength solution of sodium lauryl sulfate | and this initial charge was heated to 85° C. with stirring. Subsequently, with this temperature being maintained, 10% of feed stream 3 was added and the mixture was stirred for 5 minutes. Thereafter feed streams 1 and 2 were metered in over 180 minutes and in parallel therewith the remainder of feed stream 3, over 195 minutes.

| Feed stream 1: | 52.2 g | water |
|---|---|---|
| | 51 g | a 15% strength solution of sodium lauryl sulfate |
| | 99 g | n-butyl acrylate |
| | 81.9 g | methyl methacrylate |
| | 55.2 g | styrene |
| | 11.4 g | acetoacetoxyethyl methacrylate |
| Feed stream 2: | 194.5 g | water |
| | 12 g | 25% strength ammonia solution |
| | 270 g | WorléeSol ® 61E |
| Feed stream 3: | 70.2 g | water |
| | 1.8 g | ammonium peroxodisulfate |

When feed stream 3 was ended, polymerization was continued for 30 minutes and the batch was neutralized with 1.62 g of ammonia (in the form of a 25% strength aqueous solution). Then 5.4 g of hydrogen peroxide (in the form of a 5% strength aqueous solution) were added, and a solution of 0.23 g of ascorbic acid (ASCA) in 2.03 g of water was metered in over 60 minutes.

The dispersion was subsequently cooled and filtered through a 125 μm filter. This gave 1.04 kg of a 45% dispersion.

Examples 2-6

As Example 1, but only

| Feed stream 2: | 151.3 g | water |
|---|---|---|
| | 9.3 g | a 25% strength ammonia solution |
| | 210 g | WorléeSol ® 61E | and about 900 g of 45% dispersions were obtained. The examples differed in the manner listed in Table 1.

TABLE 1

Configuration of feed streams for Examples 2 to 6

| | Feed stream 1 | Feed stream 2 | | | |
|---|---|---|---|---|---|
| | | in initial charge | as feed stream | from start of feed stream 1 | after end of feed stream 1 |
| Example 2 | 180 min | — | all | 180 min | — |
| Example 3 | 180 min | ⅓ of the amount | ⅔ of the amount | 120 min | — |
| Example 4 | 180 min | — | all | 120 min | — |
| Example 5 | 120 min | — | all | — | 60 min |
| Example 6 | 180 min | — | all | — | 60 min, during metering of ASCA |

Example 7

A polymerization vessel equipped with metering apparatus and temperature regulation was charged with the following:

| Initial charge: | 116.1 g | water |
|---|---|---|
| | 19.2 g | a polystyrene seed dispersion having a solids content of 33% and an average particle size of 30 nm |
| | 1.5 g | a 15% strength solution of sodium lauryl sulfate | and this initial charge was heated to 85° C. with stirring. Subsequently, with this temperature being maintained, 10% of feed stream 3 was added and the mixture was stirred for 5 minutes. Thereafter feed streams 1 and 2 were metered in over 180 minutes and in parallel therewith the remainder of feed stream 3, over 195 minutes.

| Feed stream 1: | 79.5 g | water |
|---|---|---|
| | 51.2 g | a 15% strength solution of sodium lauryl sulfate |
| | 117.4 g | n-butyl acrylate |
| | 97.1 g | methyl methacrylate |
| | 65.5 g | styrene |
| | 13.5 g | acetoacetoxyethyl methacrylate |
| Feed stream 2: | 371.7 g | WorléeSol ® 61E neutralized with $NH_3$ (solids content 42.5%) |
| Feed stream 3: | 72.2 g | sodium peroxodisulfate (2.5% by weight) |

When feed stream 3 was ended, polymerization was continued for 30 minutes and the batch was neutralized with 0.51 g of ammonia (in the form of a 25% strength aqueous solution). Then 5.4 g of hydrogen peroxide (in the form of a 5% strength aqueous solution) were added, and a solution of 0.23 g of ascorbic acid (ASCA) in 2.3 g of water was metered in over 60 minutes.

The dispersion was subsequently cooled and filtered through a 125 μm filter. This gave 1.04 kg of a 45% dispersion.

Example 8

As Example 7, but:

| Feed stream 3: | 108.3 g | sodium peroxodisulfate (2.5% by weight) |
|---|---|---|

Example 9

As Example 7, but:

| Feed stream 3: | 51.9 g | sodium peroxodisulfate (7% by weight) |
|---|---|---|

Example 10

As Example 7, but:

| Feed stream 3: | 64.5 g | sodium peroxodisulfate (7% by weight) |
|---|---|---|

Example 11

As Example 7, but:

| Feed stream 1: | 58.6 g | water |
|---|---|---|
| | 51.2 g | a 15% strength solution of sodium lauryl sulfate |
| | 60.0 g | n-butyl acrylate |
| | 154.4 g | n-butyl methacrylate |
| | 65.5 g | styrene |
| | 13.5 g | acetoacetoxyethyl methacrylate |

Example 12

As Example 11, but:

| Feed stream 3: | 54.2 g | sodium peroxodisulfate (5% by weight) |
|---|---|---|

Example 13

As Example 11, but:

| Feed stream 3: | 72.2 g | sodium peroxodisulfate (5% by weight) |
|---|---|---|

Example 14

As Example 11, but:

| Feed stream 3: | 90.3 g | sodium peroxodisulfate (5% by weight) |
|---|---|---|

Example 15

As Example 7, but addition of the alkyd (feed stream 2) not at constant rate
Metering speed of feed stream 2:
12.5 g; 22.5 g; 32.5 g; 58.1 g; 98.1 g; 148.1 g each 30 minutes

Example 16

As Example 7, but addition of the alkyd (feed stream 2) not at constant rate
Metering speed of feed stream 2:
12.5 g; 32.5 g; 52.5 g; 78.1 g; 98.3 g; 118.1 g each 30 minutes

Example 17

As Example 7, but polymerization temperature 95° C.

Example 18

As Example 7, but polymerization temperature 80° C.

Example 19

As Example 7, but

| Feed stream 2: | 217 g WorléeSol ® 61 E neutralized with NH$_3$ (solids content 72.8%) |
|---|---|

Example 20

As Example 1, but only

| Feed stream 2: | 108.1 g | water |
|---|---|---|
| | 6.7 g | a 25% strength ammonia solution |
| | 150 g | WorléeSol ® 61E | and 830 g of a 45% dispersion were obtained.

Comparative Example 1

A polymerization vessel equipped with metering apparatus and temperature regulation was charged with the following:

| Initial charge: | 57.5 g | water |
|---|---|---|
| | 3.1 g | a 15% solution of sodium lauryl sulfate | and this initial charge was heated to 85° C. with stirring. Subsequently, with this temperature being maintained, 10% of feed streams 1 and 2 were added in succession and initial polymerization was carried out for 10 minutes. Thereafter the remainders of feed stream 1, over 180 min, and in parallel, of feed stream 2, over in 195 min, were metered in.

| Feed stream 1: | 142.6 g | water |
|---|---|---|
| | 30.7 g | a 15% strength solution of sodium lauryl sulfate |
| | 5.8 g | a 20% strength solution of a fatty alcohol ethoxylate having a degree of ethoxylation of approximately 18 (Lutensol ® AT 18 from BASF) |
| | 76.7 g | WorléeSol ® 61E |
| | 69 g | n-butyl acrylate (BA) |
| | 57.5 g | methyl methacrylate (MMA) |
| | 34.5 g | styrene (S) |
| | 4.6 g | methacrylic acid |
| | 6.9 g | acetoacetoxyethyl methacrylate |

First of all the alkyd resin is dissolved in the monomer mixture of BA, MMA, and S. Then the remaining ingredients are added. An ultrasound probe was used to convert this mixture into a stable miniemulsion.

| Feed stream 2: | 11.4 g | water |
| --- | --- | --- |
| | 0.9 g | sodium peroxodisulfate |

After the end of feed stream 2, polymerization was continued for 30 minutes and the batch was neutralized with 3.65 g of ammonia (in the form of a 25% strength aqueous solution). Thereafter 2.8 g of hydrogen peroxide (in the form of a 5% strength aqueous solution) were added and a solution of 0.12 g of ascorbic acid in 11.5 g of water was metered in over 60 minutes.

The dispersion was subsequently cooled and filtered through a 125 μm filter. This gave 519 g of a 44% dispersion.

Comparative Example 2

A polymerization vessel equipped with metering apparatus and temperature regulation was charged with the following:

| Initial charge: | 100.3 g | water |
| --- | --- | --- |
| | 16.5 g | a polystyrene seed dispersion having a solids content of 33% and an average particle size of 30 nm |
| | 1.5 g | a 15% solution of sodium lauryl sulfate | and this initial charge was heated to 85° C. with stirring. Subsequently, with this temperature being maintained, 10% of feed stream 2 was added in succession and stirring was carried out for 5 minutes. Thereafter feed stream 1, over 180 min, and in parallel, the remainder of feed stream 3, over in 195 min, was metered in.

| Feed stream 1: | 219.5 g | water |
| --- | --- | --- |
| | 44.2 g | a 15% strength solution of sodium lauryl sulfate |
| | 182 g | WorléeSol ® 61E |
| | 8.1 g | a 25% strength ammonia solution |
| | 101.4 g | n-butyl acrylate |
| | 83.9 g | methyl methacrylate |
| | 56.6 g | styrene |
| | 11.7 g | acetoacetoxyethyl methacrylate |

First of all the alkyd resin is dissolved in water and ammonia, and the remaining ingredients are added and emulsified.

| Feed stream 3: | 60.8 g | water |
| --- | --- | --- |
| | 1.6 g | ammonium peroxodisulfate |

After the end of feed stream 3, polymerization was continued for 30 minutes and the batch was neutralized with 1.4 g of ammonia (in the form of a 25% strength aqueous solution). Thereafter 4.7 g of hydrogen peroxide (in the form of a 5% strength aqueous solution) were added and a solution of 0.20 g of ascorbic acid in 1.8 g of water was metered in over 60 minutes.

The dispersion was subsequently cooled and filtered through a 125 μm filter. This gave 1.04 kg of a 43% dispersion.

Comparative Dispersion 1

A polymerization vessel equipped with metering apparatus and temperature regulation was charged with the following:

| Initial charge: | 528 g | water |
| --- | --- | --- |
| | 46.7 g | a polystyrene seed dispersion having a solids content of 33% and an average particle size of 30 nm |
| | 3.67 g | a 15% strength solution of sodium lauryl sulfate | and this initial charge was heated to 85° C. with stirring. Subsequently, with this temperature being maintained, 5% of feed stream 2 was added and the mixture was stirred for 5 minutes. Thereafter feed stream 1 was metered in over 180 minutes and in parallel therewith the remainder of feed stream 2, over 195 minutes.

| Feed stream 1: | 543.2 g | water |
| --- | --- | --- |
| | 125.4 g | a 15% strength solution of sodium lauryl sulfate |
| | 458.0 g | n-butyl acrylate |
| | 399.6 g | methyl methacrylate |
| | 165.1 g | styrene |
| | 22.78 g | methacrylic acid |
| | 21.45 g | ureidomethacrylate |
| | 33 g | Bisomer MPEG ® 350 MA (from Laporte Performance Chemicals UK) |
| Feed stream 2: | 83.6 g | water |
| | 4.4 g | sodium peroxodisulfate |

After the end of feed stream 1, 22 g of water were added; when feed stream 2 was ended, polymerization was continued for 30 minutes and the batch was neutralized with 7.47 g of ammonia (in the form of a 25% strength aqueous solution). Then 13.2 g of hydrogen peroxide (in the form of a 5% strength aqueous solution) were added, and a solution of 0.557 g of ascorbic acid in 4.96 g of water was metered in over 60 minutes.

The dispersion was subsequently cooled and filtered through a 125 μm filter. This gave 2.48 kg of a 46% dispersion.

Preparation of Aqueous Paints

The individual components (for manufacturer list see Table 2) were metered in with stirring, using a toothed-disk stirrer, in the amounts (parts by weight) and sequence as indicated in Table 3. Following the addition of the titanium dioxide pigment the speed was increased to 2000 rpm and dispersion was continued until the pigment paste was smooth, i.e., free from lumps. The formulation was then left to cool to room temperature, if necessary, and the remaining components were added at a reduced speed.

TABLE 2

| Function | Name | Manufacturer |
| --- | --- | --- |
| Alkyd varnish | Sikkens Rubbol ® AZ | Akzo Nobel, Wunstorf |
| Dispersants | Disperbyk ® 190 | Byk-Chemie GmbH, Wesel |
| | Pigmentverteiler MD 20 and Ultradispers AB30 | BASF AG, Ludwigshafen |
| Defoamers | Byk ® 020 | Byk-Chemie GmbH, Wesel |
| | Tego Airex ® 902W | Tego Chemie, Essen |
| Preservative | Parmetol ® A26 | Schülke & Mayr, Norderstedt |
| Solvents | Solvenon ® DPM | BASF AG, Ludwigshafen |
| | Texanol ® | Eastman Deutschland, Cologne |

TABLE 2-continued

| Function | Name | Manufacturer |
|---|---|---|
| Titanium dioxide pigments | Tronox ® CR 828 Kronos ® 2190 | Kerr-McGee, Uerdingen Kronos Titan GmbH, Leverkusen |
| Thickeners | Collacral ® LR 8989 DSX 3000, DSX 2000 and DSX 1514 | BASF AG, Ludwigshafen Cognis Deutschland GmbH&Co. KG, Dusseldorf |

TABLE 3

Formulation of Comparative Dispersion 1 and of Inventive and Comparative Examples

| Component | Name | Comparative Dispersion | Inventive/ Comparative Examples |
|---|---|---|---|
| Water | | 65 | 74.5 |
| Dispersant | Pigmentverteiler MD 20 | 20 | — |
| Thickener | Ultradispers AB 30 | 15 | — |
| Defoamer | Byk ® 020 | — | 5 |
| Dispersant | Disperbyk ® 190 | — | 23.5 |
| Thickener | DSX 2000/1514 (1:0.3) | — | 12 |
| Preservative | Parmetol ® A26 | 2 | — |
| Defoamer | Tego Airex ® 902W | 4 | — |
| Thickeners | DSX 3000 | 17 | — |
| | Collacral ® LR 8989 | 15 | — |
| Titanium oxide | Tronox ® CR 828 | 225 | — |
| | Kronos ® 2190 | — | 236 |
| Paste | | 363 | 351 |
| Water | | | 27 |
| Solvents | Texanol ® | 15 | — |
| | Solvenon ® DPM | 17 | — |
| | Propylene glycol | | 22 |
| Defoamer | Tego Airex ® 902W | 2 | — |
| Binder | | 570 | 600 |
| Water | | 33 | — |
| Total | | 1000 | 1000 |

Testing the Aqueous Paints

The gloss of the coating material is determined in accordance with DIN EN ISO 2813: the coating material is applied with a 240 μm slot width to a glass plate and is dried at room temperature for 72 hours. The test specimen is inserted into a calibrated reflectometer of haze-gloss type (from Byk-Gardner, Geretsried), and the reflectometer value, at 20° and 60° incident angles, and also the haze are read off. The reflectometer value determined is a measure of the gloss (the higher the reflectometer value, the higher the gloss).

The gloss figures for the Inventive and Comparative Examples, the Comparative Dispersion, and an alkyd varnish are compiled in Table 4.

TABLE 4

Gloss figures for the Inventive/Comparative Examples, the Comparative Dispersion, and the alkyd varnish

| | | Gloss | | |
|---|---|---|---|---|
| Experiment | Description | at 60° | at 20° | haze |
| Example 1 | with 45% alkyd | 90 | 82 | 0 |
| Example 2 | with 35% alkyd | 90 | 79 | 32 |
| Example 3 | with 35% alkyd | 90 | 74 | 80 |
| Example 4 | with 35% alkyd | 91 | 78 | 52 |
| Example 5 | with 35% alkyd | 88 | 71 | 82 |
| Example 6 | with 35% alkyd | 89 | 74 | 67 |
| Example 7 | 0.4 pphm NaPS | 91 | 79 | 38 |
| Example 8 | 0.6 pphm NaPS | 91 | 81 | 28 |
| Example 9 | 0.8 pphm NaPS | 91 | 81 | 5 |

TABLE 4-continued

Gloss figures for the Inventive/Comparative Examples, the Comparative Dispersion, and the alkyd varnish

| | | Gloss | | |
|---|---|---|---|---|
| Experiment | Description | at 60° | at 20° | haze |
| Example 10 | 1.0 pphm NaPS | 91 | 82 | 1 |
| Example 11 | BMA instead of MMA, 0.4 pphm NaPS | 90 | 81 | 4 |
| Example 12 | BMA instead of MMA, 0.6 pphm NaPS | 91 | 82 | 0 |
| Example 13 | BMA instead of MMA, 0.8 pphm NaPS | 91 | 82 | 2 |
| Example 14 | BMA instead of MMA, 1.0 pphm NaPS | 90 | 82 | 0 |
| Example 15 | alkyd gradient | 88 | 70 | 83 |
| Example 16 | alkyd gradient | 90 | 75 | 80 |
| Example 17 | 95° C. | 91 | 80 | 30 |
| Example 18 | 80° C. | 90 | 75 | 76 |
| Example 19 | alkyd of higher solids content | 91 | 78 | 41 |
| Example 20 | with 25% alkyd | 88 | 67 | 101 |
| Comparative Example 1 | miniemulsion polymerization | 87 | 67 | 75 |
| Comparative Example 2 | polymerization with one feed stream | 90 | 80 | 20 |
| Comparative Dispersion 1 | no alkyd | 85 | 62 | 156 |
| Solventborne alkyd varnish | Rubbol ® AZ | 92 | 83 | 17 |

The invention claimed is:

1. An aqueous binder composition obtained by emulsion polymerization of
    (A) at least one $C_1$-$C_{10}$ alkyl (meth)acrylate, or at least one vinylaromatic compound having up to 20 C atoms, or a mixture thereof (monomers A),
    (B) optionally at least one monomer B (monomers B), in the presence of
    (C) a solution of at least one water-soluble alkyd resin having a weight-average molecular weight between 5000 and 40 000 Da (alkyds C),
    wherein monomers A and optionally the monomers B are fed into a polymerization vessel parallel to a feed of said alkyds C and polymerization takes place by way of two or more spatially separate feed streams; and
    wherein an initiator for said emulsion polymerization is a water-soluble initiator.

2. The aqueous binder composition according to claim 1, wherein the emulsion polymer comprises in total
    (A) 20% to 90% by weight of monomers A,
    (B) 0% to 20% by weight of monomers B, and
    (C) 10% to 60% by weight of alkyds C.

3. The aqueous binder composition according to claim 1, wherein the vinylaromatic compound is selected from the group consisting of vinyltoluene, a-methylstyrene, p-methylstyrene, a-butylstyrene, 4-n-butylstyrene, 4-n-decylstyrene, styrene, and a mixture thereof.

4. The aqueous binder composition according to claim 1, wherein the $C_1$-$C_{10}$ alkyl (meth)acrylate is selected from the group consisting of methyl (meth)acrylate, n-butyl (meth)acrylate, iso-butyl (meth)acrylate, tert-butyl (meth)acrylate, ethyl acrylate, 2-ethylhexyl (meth)acrylate, and a mixture thereof.

5. The aqueous binder composition according to claim 1, wherein the monomer B is selected from the group of monomers comprising hydroxyl groups consisting of $C_1$-$C_{10}$ hydroxyalkyl (meth)acrylates, (meth)acrylamide, ethylenically unsaturated acids, ureido(meth)acrylate, acetoacetoxy (meth)acrylate and diacetoneacrylamide.

6. The aqueous binder composition according to claim 1, wherein the glass transition temperature of a polymer originating theoretically from a separate polymerization of the monomers A or from monomers A and monomers B, respectively, is less than 50° C. and greater than 20° C.

7. A process for preparing an aqueous binder according to claim 1, which comprises carrying out the polymerization of the monomers A or monomers A and monomers B and of the alkyds C in the form of a parallel feed process.

8. A coating material comprising an aqueous binder composition according to claim 1.

9. The coating material according to claim 8, which is a high-gloss varnish having a gloss of greater than 60 at 20° wherein ° is an incident angle.

10. The aqueous binder composition according to claim 5, wherein the ethylenically unsaturated acids are at least one selected from the group consisting of (meth)acrylic acid, (meth)acrylic acid anhydride, dicarboxylic acid, dicarboxylic acid anhydride, and dicarboxylic acid monoester.

11. The aqueous binder composition according to claim 5, wherein the ethylenically unsaturated acids are at least one selected from the group consisting of itaconic acid, maleic acid, fumaric acid, and maleic anhydride.

12. A method of coating materials comprising coating a material with the aqueous binder composition according to claim 1.

13. A method of varnishing comprising applying the binder composition according to claim 1 as a component in a high-gloss varnish.

14. The aqueous binder composition according to claim 1, wherein said alkyds C has an acid number of 30 to 65 mg/KOH/g alkyd resin solids.

15. The aqueous binder composition according to claim 1, wherein said alkyds C has a weight-average molecular weight of 8,000 to 35,000 Da.

16. The aqueous binder composition according to claim 1, wherein said alkyds C has a weight-average molecular weight of 10,000 to 35,000 Da.

* * * * *